(12) United States Patent
Giangarra et al.

(10) Patent No.: US 8,726,224 B1
(45) Date of Patent: May 13, 2014

(54) SYSTEM, METHOD, AND COMPUTER PROGRAM PRODUCT FOR HIERARCHICAL BROWSING

(71) Applicant: Cadence Design Systems, Inc., San Jose, CA (US)

(72) Inventors: Philip Benedict Giangarra, Medway, MA (US); Debra Jean Wimpey, Lowell, MA (US); Michael James Floyd, Natick, MA (US); Abu Nasser Mohammed Abdullah, Methuen, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/650,800

(22) Filed: Oct. 12, 2012

Related U.S. Application Data

(60) Provisional application No. 61/702,714, filed on Sep. 18, 2012.

(51) Int. Cl.
*G06F 15/04* (2006.01)
*G06F 17/50* (2006.01)

(52) U.S. Cl.
USPC .......................... 716/139; 716/132; 716/133

(58) Field of Classification Search
CPC .................. G06F 17/5022; G06F 2217/78

USPC .......................................... 716/132, 133, 139
See application file for complete search history.

(56) References Cited

U.S. PATENT DOCUMENTS

| | | | |
|---|---|---|---|
| 7,640,527 B1 * | 12/2009 | Dorairaj et al. | 716/139 |
| 7,673,276 B2 * | 3/2010 | Wang | 716/104 |
| 8,214,791 B1 * | 7/2012 | O'Riordan | 716/139 |
| 8,352,235 B1 * | 1/2013 | Lin et al. | 703/18 |
| 2004/0128638 A1 * | 7/2004 | Kerzman et al. | 716/11 |
| 2005/0268269 A1 * | 12/2005 | Coiley | 716/11 |
| 2007/0245278 A1 * | 10/2007 | Chen | 716/5 |
| 2008/0016483 A1 * | 1/2008 | Chan | 716/11 |
| 2008/0059928 A1 * | 3/2008 | Takei et al. | 716/5 |
| 2011/0066995 A1 * | 3/2011 | Arsintescu et al. | 716/125 |
| 2011/0320991 A1 * | 12/2011 | Hsu et al. | 716/103 |

* cited by examiner

*Primary Examiner* — Vuthe Siek
*Assistant Examiner* — Brian Ngo
(74) *Attorney, Agent, or Firm* — Holland & Knight LLP; Mark H. Whittenberger

(57) ABSTRACT

The present disclosure relates to a computer-implemented method for electronic design visualization. The method may include providing, using at least one computing device, an electronic design and identifying a plurality of power domains associated with the electronic design. The method may further include associating, using the at least one computing device, at least two of the plurality of power domains with a particular group and displaying one or more of the plurality of power domains in a hierarchical manner.

20 Claims, 11 Drawing Sheets

SYSTEM, METHOD, AND COMPUTER PROGRAM PRODUCT FOR HIERARCHICAL BROWSING

CROSS REFERENCE TO RELATED APPLICATIONS

This application claims the benefit of U.S. Provisional Application having Ser. No. 61/702,714, filed Sep. 18, 2012, of which the entire contents are incorporated herein by reference.

FIELD OF THE INVENTION

The present disclosure relates to electronic design automation, and more specifically, to a method for displaying one or more features associated with an electronic design simulation.

DISCUSSION OF THE RELATED ART

Electronic design automation (EDA) utilizes software tools that may be used in the design and analysis of numerous electronic systems such as printed circuit boards (PCBs) and integrated circuits (ICs). Some EDA tools include power browsers, which are currently configured to display all of the power domains in a flat representation. However, a typical large chip design might have 50-100 power domains or more. Furthermore, in this situation it may be quite difficult to pair the design block with its power domains (e.g. 2-4 domains/block), since the total number of domains is so large. The power intent language formats used in connection with power domains are relatively new in EDA and their adoption is enabling larger chip designs involving large numbers of power domains.

SUMMARY OF INVENTION

In one or more embodiments of the present disclosure, a computer-implemented method for electronic design visualization. The method may include providing, using at least one computing device, an electronic design and identifying a plurality of power domains associated with the electronic design. The method may further include associating, using the at least one computing device, at least two of the plurality of power domains with a particular group and displaying one or more of the plurality of power domains in a hierarchical manner.

One or more of the following features may be included. In some embodiments, associating at least two of the plurality of power domains with a particular group may include associating at least one power domain within a subgroup. In some embodiments, the subgroup may include at least one of a power domain, a mapped domain, and an isolation port. In some embodiments, the subgroup may include at least one of a boundary port, an isolation rule, and retention information. The method may further include providing a visual indication that a power domain is enabled and/or providing a visual indication that a power domain is disabled. In some embodiments, displaying may include displaying the subgroup. In some embodiments, the plurality of power domains may include at least two distinct integrated circuit models.

In some embodiments, a computer-readable storage medium for electronic design visualization is provided. The computer-readable storage medium may have stored thereon instructions that when executed by a machine result in one or more operations. Operations may include providing, using at least one computing device, an electronic design and identifying a plurality of power domains associated with the electronic design. Operations may further include associating, using the at least one computing device, at least two of the plurality of power domains with a particular group and displaying one or more of the plurality of power domains in a hierarchical manner.

One or more of the following features may be included. In some embodiments, associating at least two of the plurality of power domains with a particular group may include associating at least one power domain within a subgroup. In some embodiments, the subgroup may include at least one of a power domain, a mapped domain, and an isolation port. In some embodiments, the subgroup may include at least one of a boundary port, an isolation rule, and retention information. Operations may further include providing a visual indication that a power domain is enabled and/or providing a visual indication that a power domain is disabled. In some embodiments, displaying may include displaying the subgroup. In some embodiments, the plurality of power domains may include at least two distinct integrated circuit models.

In one or more embodiments of the present disclosure, a system may include a computing device having at least one processor configured to simulate an electronic design and identify a plurality of power domains associated with the electronic design. The at least one processor may be further configured to associate at least two of the plurality of power domains with a particular group and displaying one or more of the plurality of power domains in a hierarchical manner.

One or more of the following features may be included. In some embodiments, the at least one processor may be further configured to associate at least two of the plurality of power domains with a particular group by associating at least one power domain within a subgroup. In some embodiments, the subgroup may include at least one of a power domain, a mapped domain, and an isolation port. In some embodiments, the subgroup may include at least one of a boundary port, an isolation rule, and retention information.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
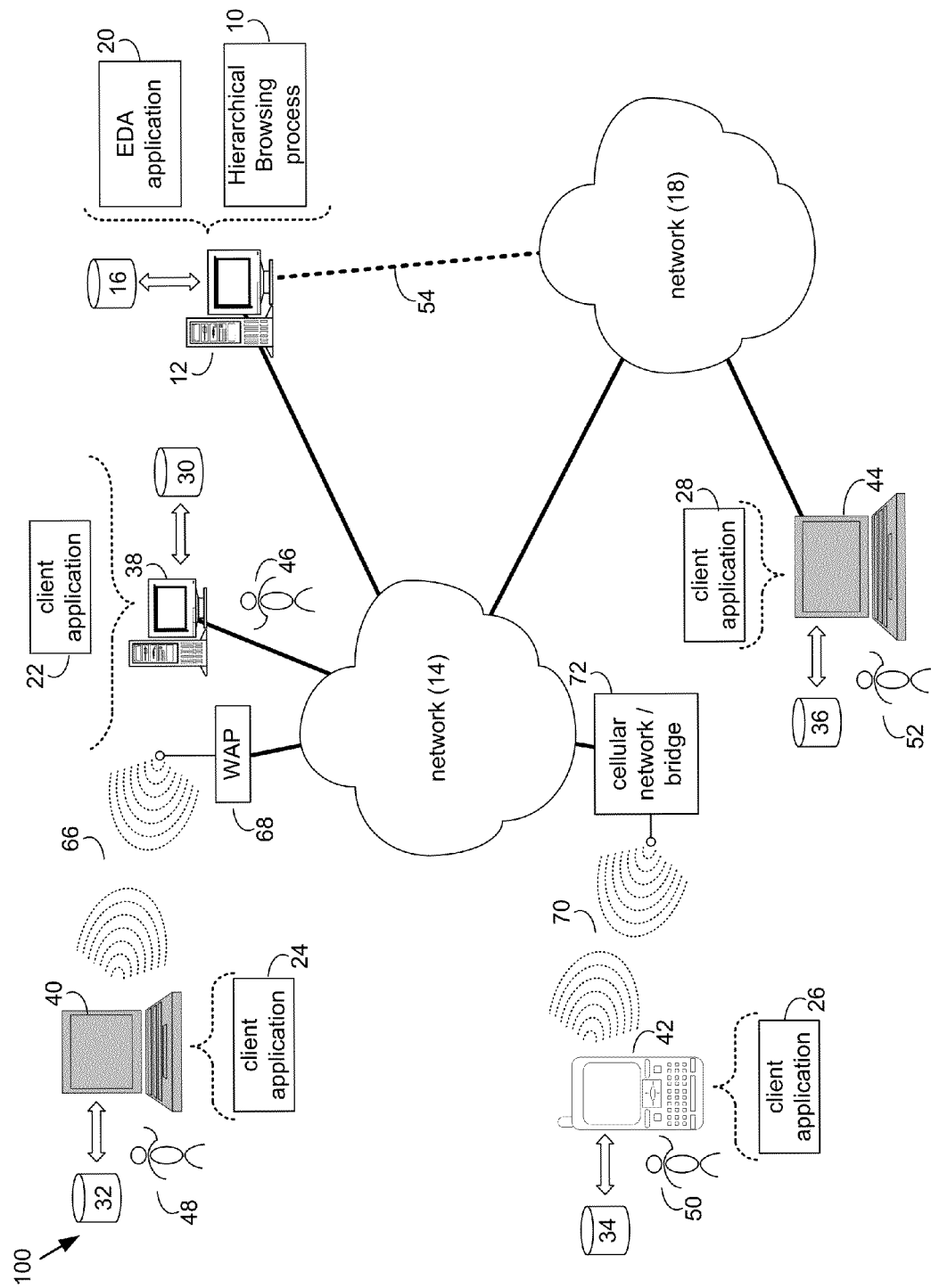
FIG. 1 is a system diagram depicting aspects of the browsing process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown browsing process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both). Additionally/alternatively, the report generation process may reside on and be executed, in whole or in part, by a client electronic device, such as a personal computer, notebook computer, personal digital assistant, or the like.

Figure 2:
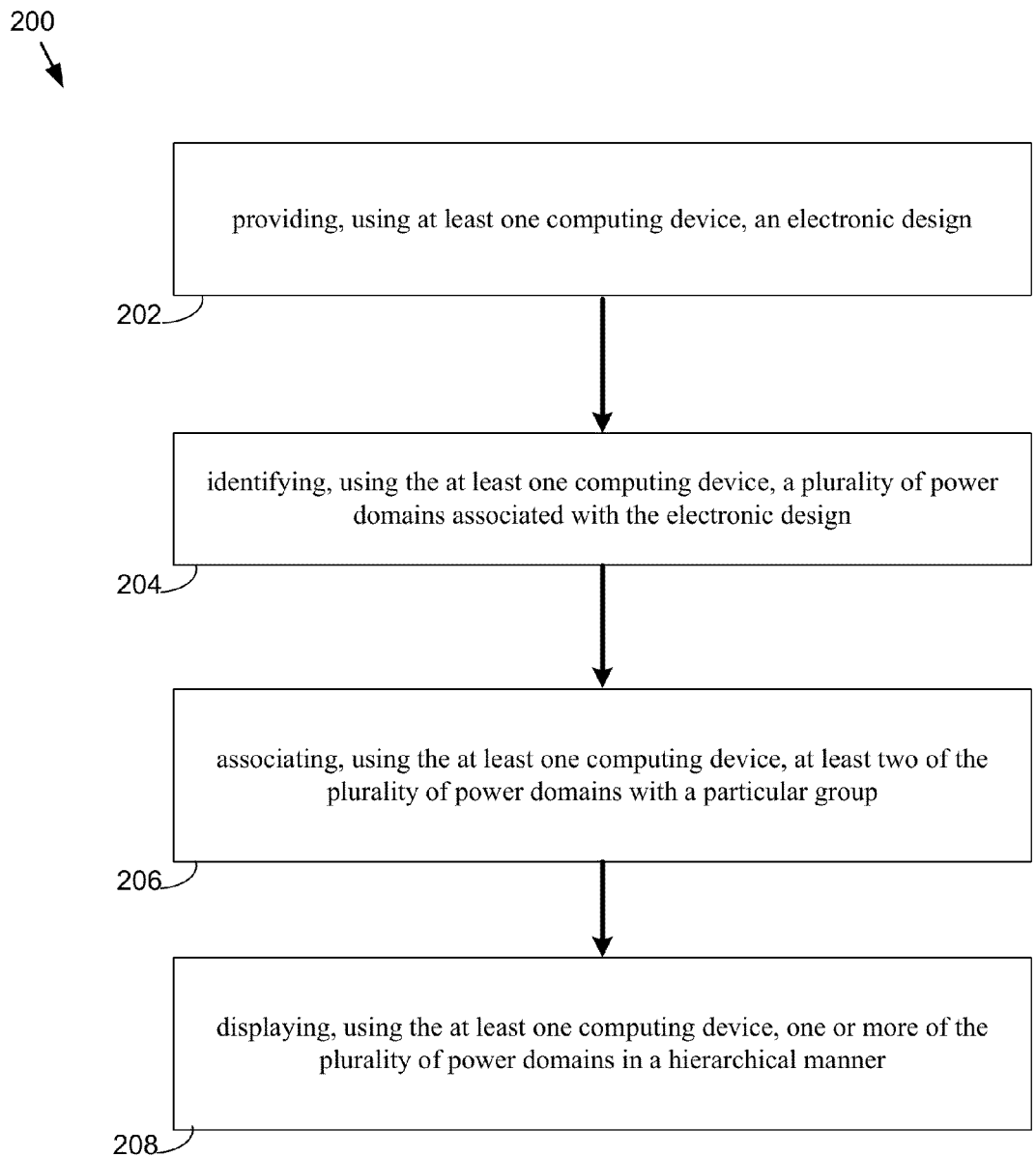
FIG. 2 is a flowchart depicting operations consistent with the browsing process of the present disclosure.

As shown in FIG. 2, and as will be discussed in further detail below, browsing process 10 may include providing (202), using at least one computing device, an electronic design and identifying (204) a plurality of power domains associated with the electronic design. The method may further include associating (206), using the at least one computing device, at least two of the plurality of power domains with a particular group and displaying (208) one or more of the plurality of power domains in a hierarchical manner.

The instruction sets and subroutines of browsing process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Browsing process 10 may be a stand alone application, or may be an applet/application/script that may interact with and/or be executed within EDA application 20. In addition/as an alternative to being a server-side process, the browsing process may be a client-side process (not shown) that may reside on a client electronic device (described below) and may interact with an EDA client application (e.g., one or more of EDA client applications 22, 24, 26, 28). Further, the browsing process may be a hybrid server-side/client-side process that may interact with EDA application 20 and an EDA client application (e.g., one or more of client applications 22, 24, 26, 28). As such, the browsing process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize browsing process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Embodiments described herein are directed towards a method for displaying one or more features associated with an electronic design simulation. Embodiments disclosed herein include a hierarchical power browser, which may be configured to display various power domains in a hierarchical manner.

Embodiments of the browsing process described herein may be used in accordance with the Common Power Format (CPF), Unified Power Format (UPF) or any suitable format and/or standard used in the design and verification of low power integrated circuits. The teachings of the present disclosure are intended to be power intent language neutral.

The term "hierarchical" as used herein, and in addition to its ordinary meaning, may refer to a system of groups and subgroups and/or submenus, which may allow a user to visualize certain portions of an electronic design while maintaining other portions of the electronic design as hidden, if desired.

In some embodiments, EDA application 20 may be configured to perform testbench automation, reuse, and analysis to verify designs from the system level, through RTL, to the gate level. EDA application 20 may support a metric-driven approach. EDA application 20 may utilize a native-compiled architecture in order to speed the simultaneous simulation of transaction-level, behavioral, low-power, RTL, and gate-level models.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 may be configured to fuel testbench automation, analysis, and reuse for increased productivity. EDA application 20 may be configured to ensures verification quality by tracking industry-standard coverage metrics, including functional, transactional, low-power, and HDL code, plus automatic data and assertion checking EDA application 20 may be configured to drive and/or guide verification with an automatically backannotated and executable verification plan. EDA application 20 may be configured to create reusable sequences and multichannel virtual sequences on top of a multi-language verification environment and to configure existing Universal Verification Components (UVCs) or quickly constructs all-new UVCs. EDA application 20 may be configured to enable advanced debug for transaction-level models, System Verilog/e class libraries, transient mixed-signal, low-power, and traditional waveform analysis.

In some embodiments, EDA application 20 may supports e, Open Verification Library (OVL), OVM class library, emerging UVM class library, SystemC®, SystemC Verification Library, System Verilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

Figure 3:
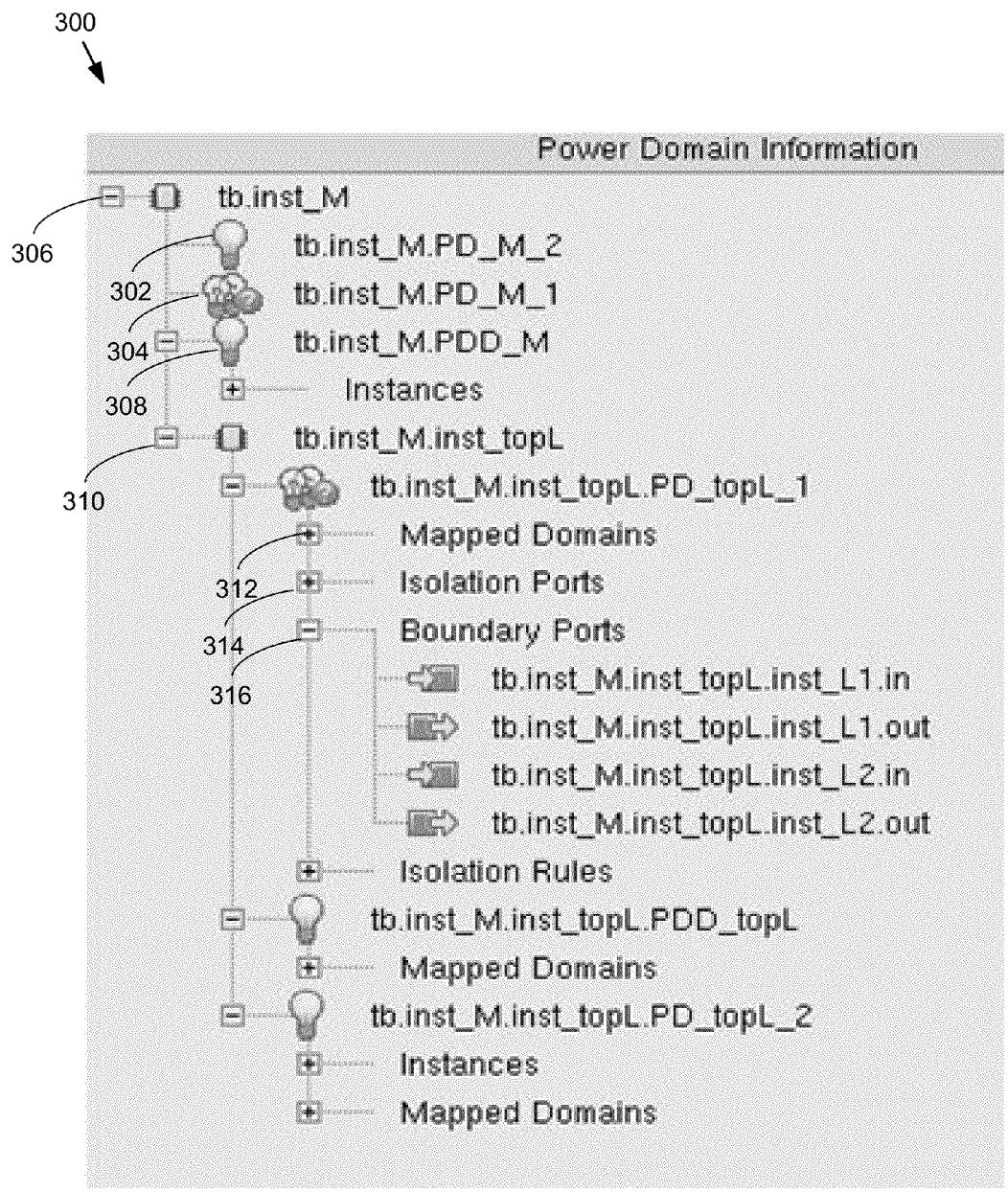
FIG. 3 is a user interface depicting aspects of the browsing process in accordance with an embodiment of the present disclosure.

Referring now to FIG. 3, an embodiment depicting an example of a hierarchical power browser 300 is depicted. Hierarchical power browser 300 may be configured to display (208) one or more power domains 302, 304 associated with an electronic design in a hierarchical manner. Each power domain may correspond to a distinct portion of an electronic design (e.g. a distinct SoC or portion of an SoC, etc.). In this way, the electronic design information (e.g. power information) may be inserted in the design hierarchy, which may allow the user to see just the information in the desired scope, while not displaying the rest of the design.

As shown in FIG. 3, one or more visual indications may be displayed to the user. In this particular example, power domain 302 indicates an active or enabled power domain (e.g. via illuminated light bulb icon) and power domain 304 indicates an inactive or disabled power domain (e.g. the light bulb icon that is not illuminated).

Accordingly, browsing process 10 may be configured to identify (204) a plurality of power domains associated with the electronic design and to associate (206) at least two of the plurality of power domains with a particular group. For example, module 306 includes a group of power domains, namely, power domains 302, 304, and 308. Each module may correspond to a distinct portion of the electronic design (e.g. a specific IP block, portion of an IP block, etc.).

As shown in FIG. 3, browsing process 10 may be configured to display any suitable information associated with the electronic design. In addition to the power domain information discussed above, the hierarchical power browser may be configured to display mapped domain information, isolation port information, instances, boundary port information, isolation rule information, and retention information.

In some embodiments, browsing process 10 may be configured to associate and/or display electronic design information in one or more subgroups associated with hierarchical power browser 300. For example, as shown in FIG. 3, module 306 may include various subgroups. Additionally and/or alternatively, module 310 may be a subgroup of module 306 and also may include subgroups 312, 314, and 316, which may correspond to mapped domains, isolation ports, instances, retention, and boundary ports or any other suitable element. It should be noted that each module may correspond to one or more devices, including but not limited, to integrated circuits, SoCs, etc. In some embodiments, hierarchical power browser 300 may be configured to associate certain modules with certain subgroups based upon a predefined relationship between those particular modules, subgroups, etc.

In this way, browsing process 10 may be configured to associate at least two power domains within a subgroup of a particular group. In some embodiments, some or all of the subgroups may include at least one of a power domain, a mapped domain, and an isolation port, a boundary port, an isolation rule, and retention information, etc. Browsing process 10 may also display one or more of the subgroups as shown in FIG. 3. The groups and subgroups associated with hierarchical power browser 300 may be visible or hidden depending upon the user's preference.

In some embodiments, browsing process 10 may include any combination of modules, subgroups, elements, domains, instances, etc. The particular configurations shown in the Figures are provided merely by way of example, as the present disclosure is not intended to be limited to these configurations.

Figure 4:
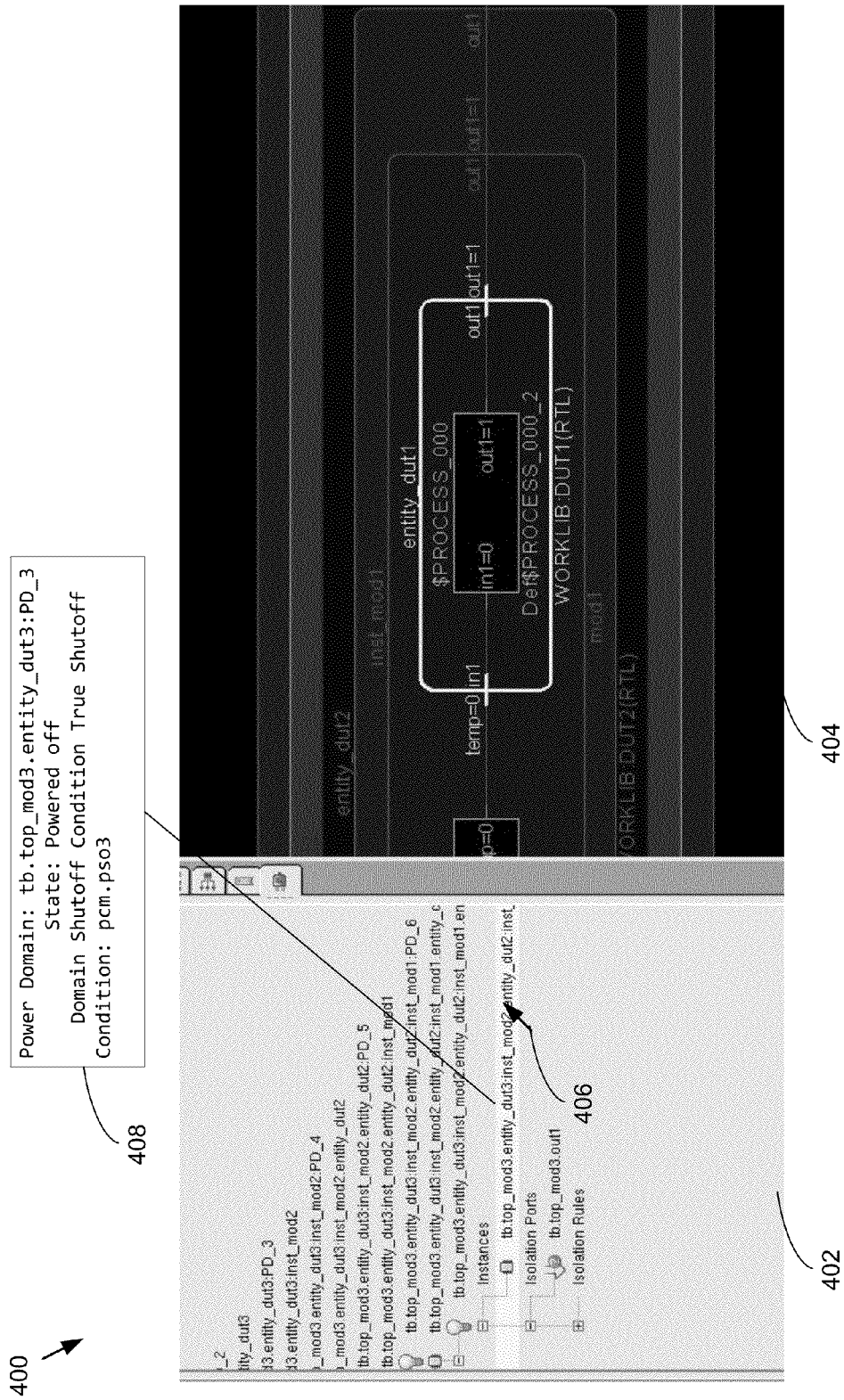
FIG. 4 is a user interface depicting aspects of the browsing process in accordance with an embodiment of the present disclosure.

Referring now to FIG. 4, an embodiment depicting an example of a graphical user interface 400 associated with browsing process 10 is shown. In this particular embodiment, hierarchical power browser 402 may display a number power domains, instances, etc, all displayed in a hierarchical manner. Accordingly, in operation, a user (e.g. user 46 associated with computing device 38) may select a particular instance using any suitable approach (e.g. using arrow 406). Once selected, browsing process 10 may be configured to display the particular instance on schematic viewer 404.

In some embodiments, browsing process 10 may be configured to display information associated with a power domain. For example, and as shown in FIG. 4, when a user hovers over a particular power domain browsing process 10 may generate and/or display information associated with that particular power domain. In the embodiment shown in FIG. 4, this information is displayed in a pop-up window 408, however, any suitable approach may be employed without departing from the scope of the present disclosure.

Figure 5:
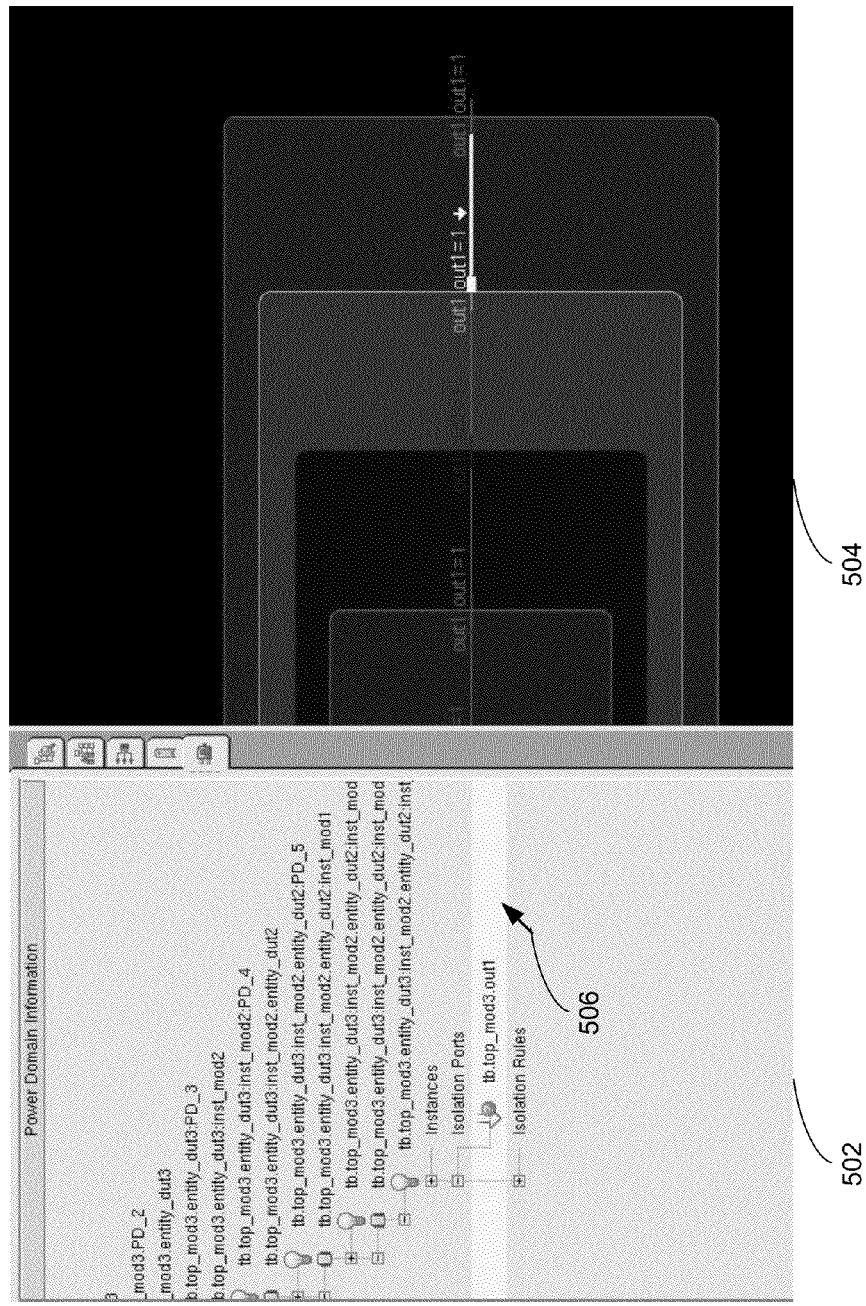
FIG. 5 is a user interface depicting aspects of the browsing process in accordance with an embodiment of the present disclosure.

Referring now to FIG. 5, an embodiment depicting an example of a graphical user interface 500 associated with browsing process 10 is shown. In this particular embodiment, hierarchical power browser 502 may display a number power domains, instances, etc, all displayed in a hierarchical manner. Accordingly, in operation, a user (e.g. user 46 associated with computing device 38) may select a particular isolation port using any suitable approach (e.g. using arrow 506). Once selected, browsing process 10 may be configured to display the particular isolation port on schematic viewer 504.

Figure 6:
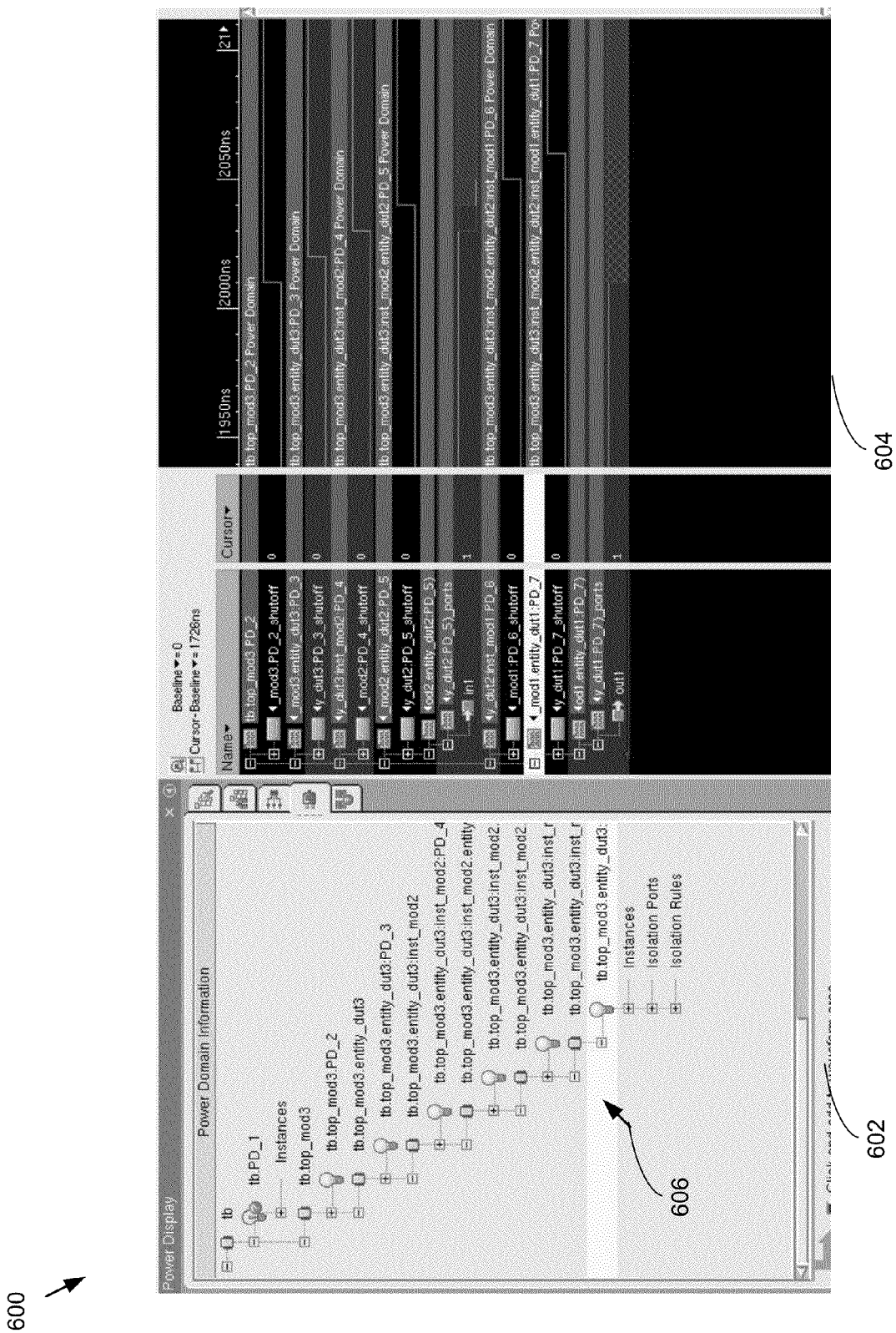
FIG. 6 is a user interface depicting aspects of the browsing process in accordance with an embodiment of the present disclosure.

Referring now to FIG. 6, an embodiment depicting an example of a graphical user interface 600 associated with browsing process 10 is shown. In this particular embodiment, hierarchical power browser 602 may display a number power domains, instances, etc, all displayed in a hierarchical manner. Accordingly, in operation, a user (e.g. user 46 associated with computing device 38) may select a particular power domain using any suitable approach (e.g. using arrow 606). Once selected, browsing process 10 may be configured to display the particular power domain on waveform viewer 604.

Figure 7:
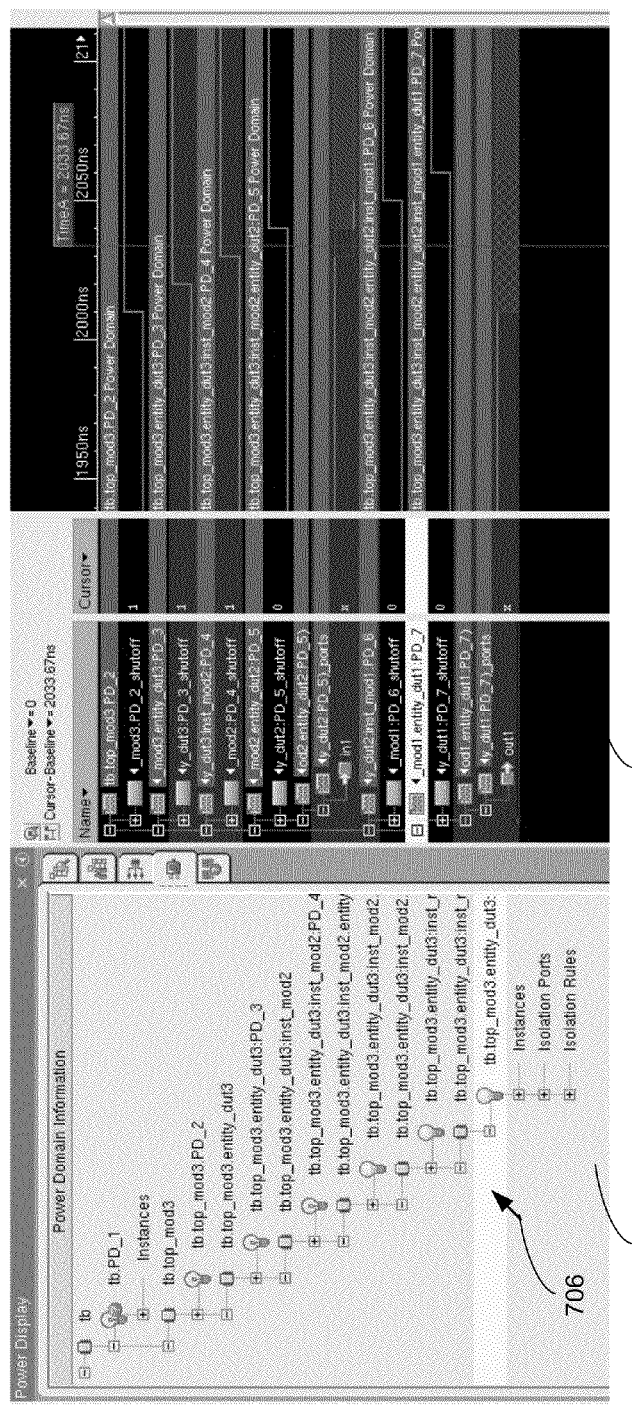
FIG. 7 is a user interface depicting aspects of the browsing process in accordance with an embodiment of the present disclosure.

Referring now to FIG. 7, an embodiment depicting an example of a graphical user interface 700 associated with browsing process 10 is shown. In this particular embodiment, hierarchical power browser 702 may display a number power domains, instances, etc, all displayed in a hierarchical manner. Accordingly, in operation, a user (e.g. user 46 associated with computing device 38) may select a particular power domain using any suitable approach (e.g. using arrow 706). Once selected, browsing process 10 may be configured to display the particular power domain on waveform viewer 704. In some embodiments, browsing process 10 may be configured to display which power domains are active and which are inactive. For example, and as shown in FIG. 7, light bulbs may be off for power domains shut off and light bulbs may be on for power domains that are active.

Figure 8:
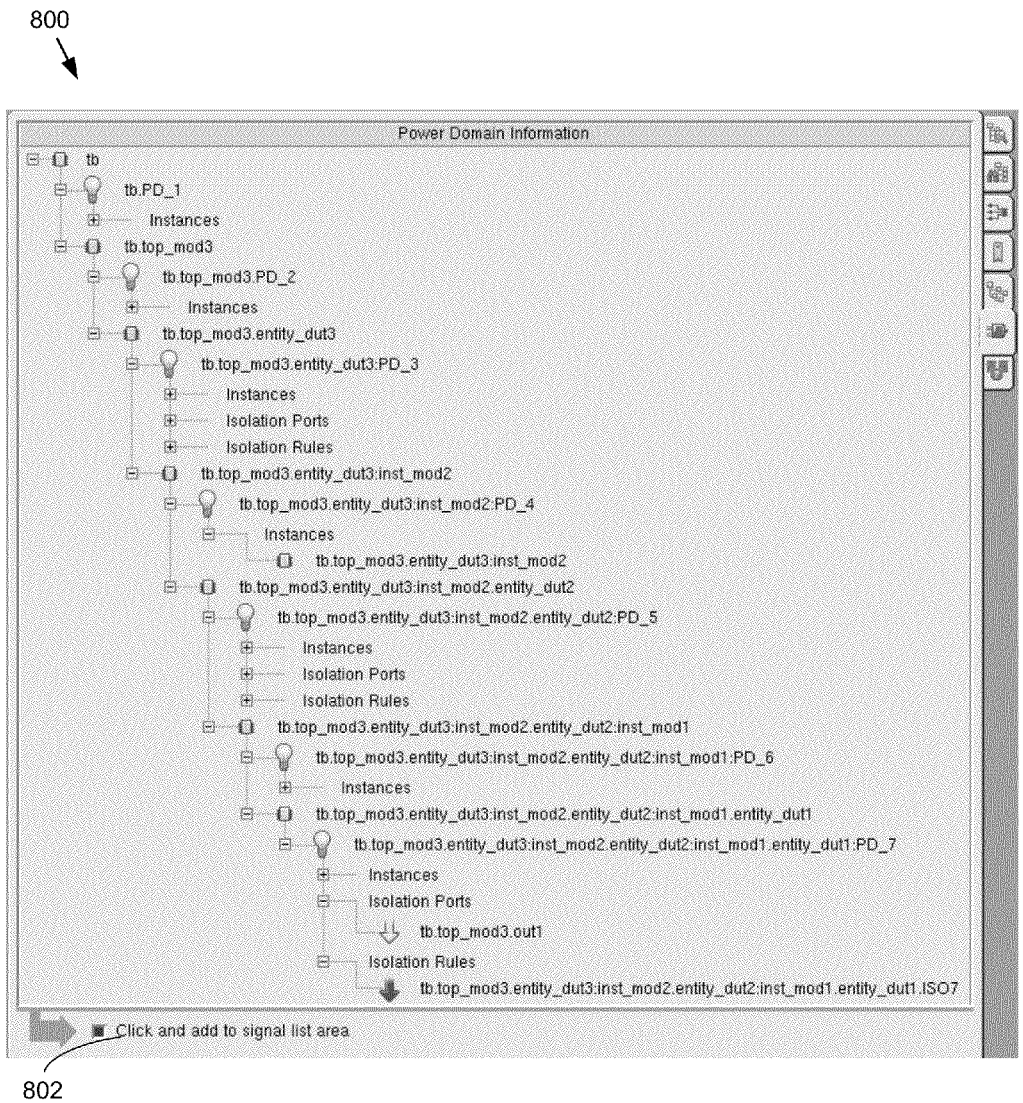
FIG. 8 is a user interface depicting aspects of the browsing process in accordance with an embodiment of the present disclosure.

Referring now to FIG. 8, an embodiment depicting an example of a graphical user interface 800 associated with browsing process 10 is shown. In this particular example, an additional embodiment depicting a hierarchical power browser 800 is shown. Browser 800 may be configured to display one or more power domains, instances, isolation ports, isolation rules in a hierarchical manner as discussed herein. Browsing process 10 may be further configured to allow a user to add one or more additional elements to the signal list area using element generation tool 802.

Figure 9:
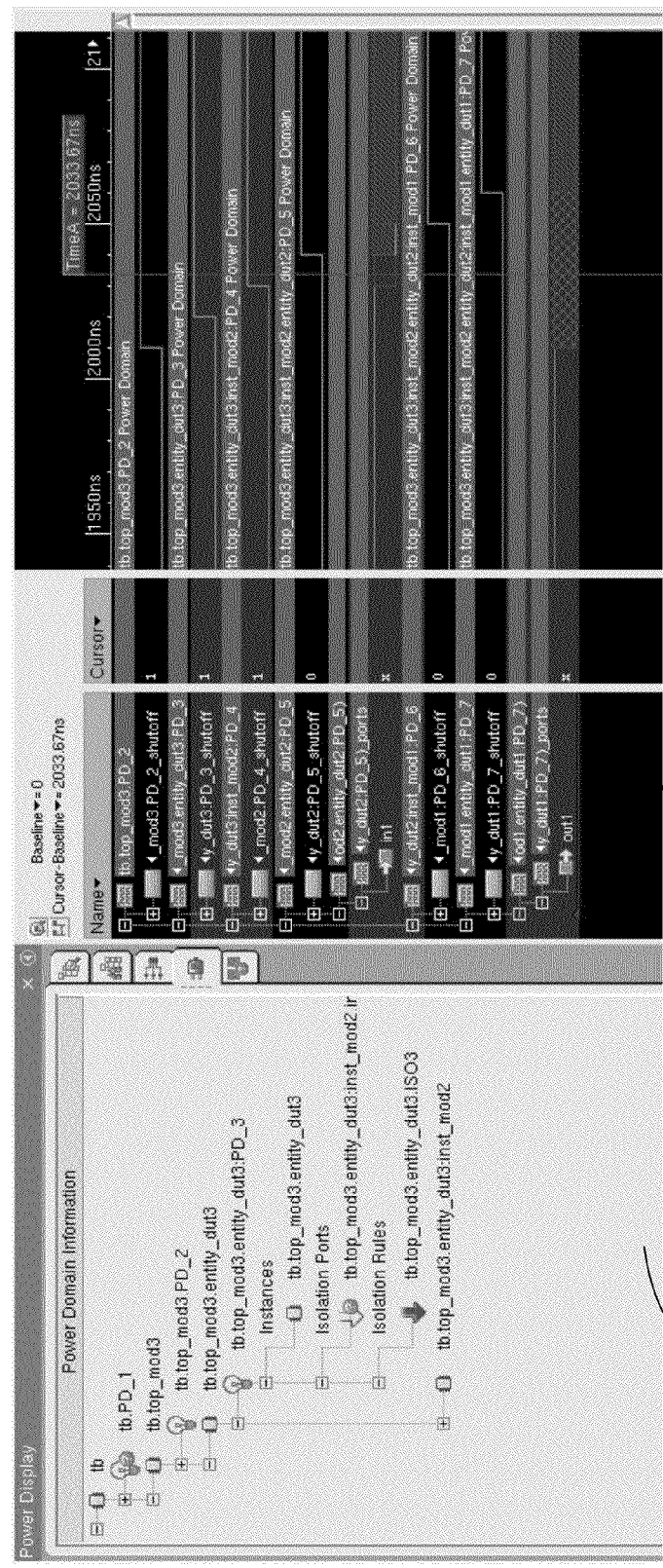
FIG. 9 is a user interface depicting aspects of the browsing process in accordance with an embodiment of the present disclosure.

Referring now to FIG. 9, an embodiment depicting an example of a graphical user interface 900 associated with browsing process 10 is shown. In this particular embodiment, hierarchical power browser 902 may display a number power domains, instances, etc, all displayed in a hierarchical manner. Accordingly, in operation, a user (e.g. user 46 associated with computing device 38) may select a particular power domain using any suitable approach. Once selected, browsing process 10 may be configured to display the selected elements on waveform viewer 904. In this particular example, various subgroups associated with hierarchical power browser 902 are shown in an expanded view (e.g., instances, isolation ports, and isolation rules).

Figure 10:
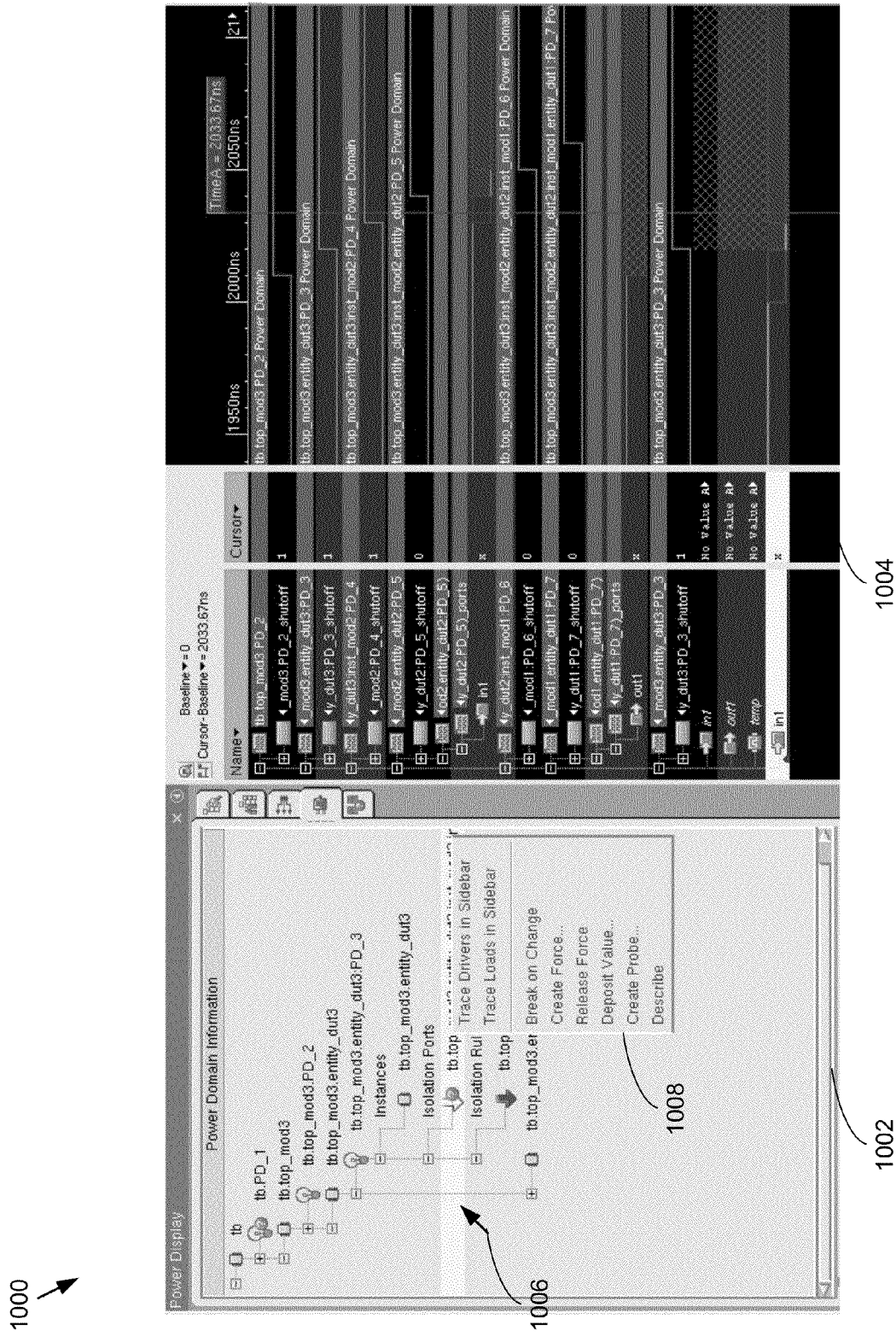
FIG. 10 is a user interface depicting aspects of the browsing process in accordance with an embodiment of the present disclosure.

Referring now to FIG. 10, an embodiment depicting an example of a graphical user interface 1000 associated with browsing process 10 is shown. In this particular embodiment, hierarchical power browser 1002 may display a number power domains, instances, etc, all displayed in a hierarchical manner. Accordingly, in operation, a user (e.g. user 46 associated with computing device 38) may select a particular instance using any suitable approach (e.g. using arrow 1006). Once selected, browsing process 10 may be configured to display the particular instance on waveform viewer 1004. Additionally and/or alternatively, browsing process 10 may be configured to allow a user to select additional functionality (e.g. by right clicking or otherwise selecting an isolation port). For example, and as shown in FIG. 10, browsing process 10 may generate drop down menu 1008, which may provide on or more additional options, some of which may include, but are not limited to, trace drivers in sidebar, trace loads in sidebar, break on change, create force, deposit value, create probe, describe, etc.

Figure 11:
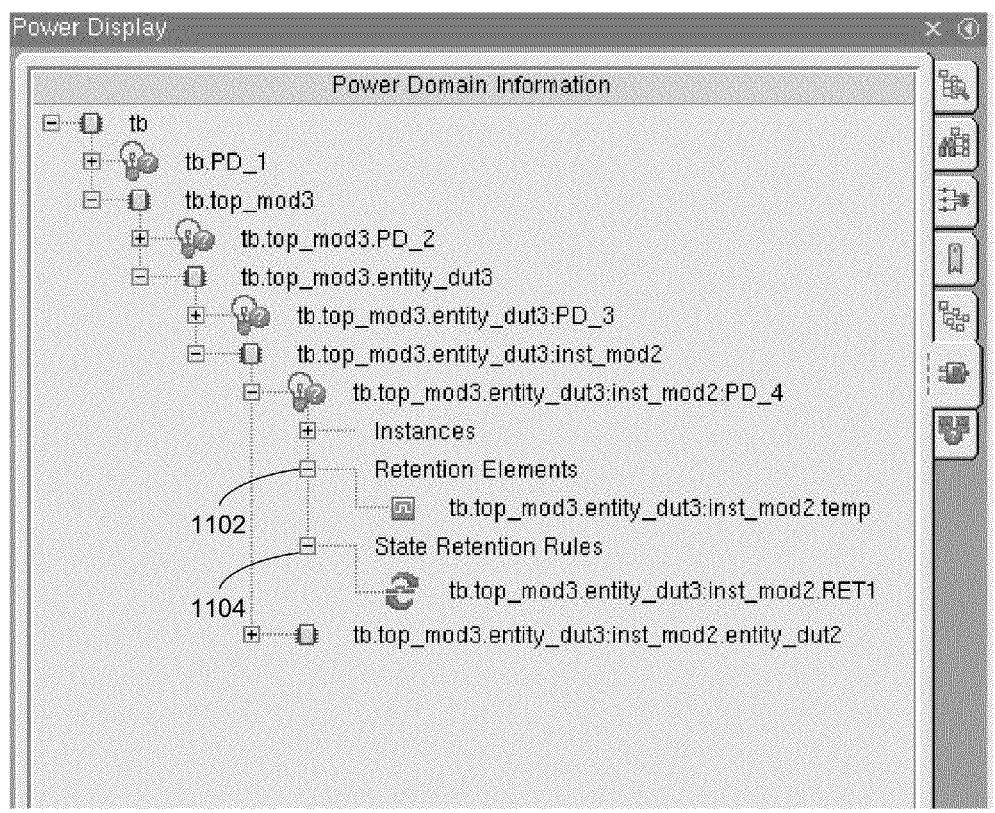
FIG. 11 is a user interface depicting aspects of the browsing process in accordance with an embodiment of the present disclosure.

Referring now to FIG. 11, an embodiment depicting an example of a graphical user interface 1100 associated with browsing process 10 is shown. In this particular embodiment, hierarchical power browser 1100 may display a number power domains, instances, etc, all displayed in a hierarchical manner. Additionally and/or alternatively, hierarchical power browser 1100 may be configured to depict retention elements 1102 and state retention rules 1104 as is shown in FIG. 11.

In some embodiments, browsing process 10 may be configured to display non-HDL signals in the waveform viewer. Some signals may include, but are not limited to, such as the "ack_delay" in the power switch. These signals may be defined in the power intent file (e.g. CPF or UPF). It may not appear in the HDL code that the user creates to describe the digital logic.

In some embodiments, aspects of the hierarchical power browser described herein may operate in a dynamic manner. For example, selecting and/or clicking on various objects may trigger certain actions, some of which may include, but are not limited to, sending domain information to the waveform, displaying an isolation port in the schematic, highlighting an instance in the schematic, etc. The ability to "right click" the object and then perform an action on it is also provided (e.g., according to the menu that appears).

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design visualization comprising:
    providing, using at least one computing device, an electronic design;
    identifying, using the at least one computing device, a plurality of power domains associated with the electronic design;
    associating, using the at least one computing device, at least two of the plurality of power domains with a particular group;
    providing, using the at least one computing device, a user selectable option to select a particular type of power information in a hierarchical display from a browser at a graphical user interface, the power information types including of power domains, mapped domains, boundary ports, isolation ports, isolation rule, and retention information; and
    displaying, using the at least one computing device, one or more of the plurality of power domains in a hierarchical display, wherein the hierarchical display is configured to allow a user to visualize certain portions of the electronic design while maintaining other portions of the electronic design as hidden, as desired.

2. The computer-implemented method of claim 1, wherein associating at least two of the plurality of power domains with a particular group includes associating at least one power domain within a subgroup.

3. The computer-implemented method of claim 2, wherein the subgroup includes at least one of a power domain, a mapped domain, and an isolation port.

4. The computer-implemented method of claim 2, wherein the subgroup includes at least one of a boundary port, an isolation rule, and retention information.

5. The computer-implemented method of claim 1, further comprising:
    providing a visual indication that a power domain is enabled.

6. The computer-implemented method of claim 1, further comprising:
    providing a visual indication that a power domain is disabled.

7. The computer-implemented method of claim 2, wherein displaying includes displaying the subgroup.

8. The computer-implemented method of claim 1, wherein the plurality of power domains includes at least two distinct integrated circuit models.

9. A non-transitory computer-readable storage medium for electronic design visualization, the computer-readable storage medium having stored thereon instructions that when executed by a machine result in the following operations:
    providing, using at least one computing device, an electronic design;
    identifying, using the at least one computing device, a plurality of power domains associated with the electronic design;
    associating, using the at least one computing device, at least two of the plurality of power domains with a particular group;
    providing, using the at least one computing device, a user selectable option to select a particular type of power information in a hierarchical display from a browser at a graphical user interface, the power information types including power domains, mapped domains, boundary ports, isolation ports, isolation rule, and retention information; and
    displaying, using the at least one computing device, one or more of the plurality of power domains in a hierarchical display, wherein the hierarchical display is configured to allow a user to visualize certain portions of the electronic design while maintaining other portions of the electronic design as hidden, as desired.

10. The computer-readable storage medium of claim 9, wherein associating at least two of the plurality of power domains with a particular group includes associating at least one power domain within a subgroup.

11. The computer-readable storage medium of claim 10, wherein the subgroup includes at least one of a power domain, a mapped domain, and an isolation port.

12. The computer-readable storage medium of claim 10, wherein the subgroup includes at least one of a boundary port, an isolation rule, and retention information.

13. The computer-readable storage medium of claim 9, further comprising:
    providing a visual indication that a power domain is enabled.

14. The computer-readable storage medium of claim 9, further comprising:
    providing a visual indication that a power domain is disabled.

15. The computer-readable storage medium of claim 10, wherein displaying includes displaying the subgroup.

16. The computer-readable storage medium of claim 9, wherein the plurality of power domains includes at least two distinct integrated circuit models.

17. A system for electronic design visualization comprising:
    a computing device having at least one processor configured to simulate an electronic design, the at least one processor further configured to identify a plurality of power domains associated with the electronic design, the at least one processor further configured to associate at least two of the plurality of power domains with a particular group, the at least one processor further configured to provide a user selectable option to select a particular type of power information in a hierarchical display from a browser at a graphical user interface, the power information types including power domains, mapped domains, boundary ports, isolation ports, isolation rule, and retention information, the at least one processor further configured to display one or more of the plurality of power domains in a hierarchical display, wherein the hierarchical display is configured to allow a user to visualize certain portions of the electronic design while maintaining other portions of the electronic design as hidden, as desired.

18. The system of claim 17, wherein the at least one processor is further configured to associate at least two of the plurality of power domains with a particular group includes associating at least one power domain within a subgroup.

19. The system of claim 18, wherein the subgroup includes at least one of a power domain, a mapped domain, and an isolation port.

20. The system of claim 18, wherein the subgroup includes at least one of a boundary port, an isolation rule, and retention information.

\* \* \* \* \*